(12) United States Patent
Wong et al.

(10) Patent No.: US 8,681,137 B2
(45) Date of Patent: Mar. 25, 2014

(54) AMBIENT LIGHT SENSOR CONFIGURED TO DETERMINE THE DIRECTION OF A BEAM OF AMBIENT LIGHT INCIDENT THEREON

(75) Inventors: Chee Heng Wong, Singapore (SG); Yu Feng Yao, Singapore (SG); Sze Ping Ong, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 281 days.

(21) Appl. No.: 13/108,985

(22) Filed: May 17, 2011

(65) Prior Publication Data

US 2012/0293472 A1   Nov. 22, 2012

(51) Int. Cl.
*G06F 3/038* (2013.01)

(52) U.S. Cl.
USPC ........... 345/207; 345/166; 345/165; 345/158; 345/102; 345/103; 345/81

(58) Field of Classification Search
None
See application file for complete search history.

(56) References Cited

U.S. PATENT DOCUMENTS

| | | | |
|---|---|---|---|
| 4,669,826 A | 6/1987 | Itoh et al. | |
| 6,853,445 B2 | 2/2005 | Perkins et al. | |
| 2009/0135167 A1* | 5/2009 | Sakai et al. | 345/207 |
| 2010/0079426 A1* | 4/2010 | Pance et al. | 345/207 |
| 2010/0331640 A1 | 12/2010 | Medina | |

FOREIGN PATENT DOCUMENTS

JP   2008/008849   1/2008

OTHER PUBLICATIONS http://dynamicslab.mpe.nus.edu.sg/dynamics/project0798/Self%20sustaining%20robots.pdf>, Chung Yuan Mei, National University of Singapore, "Self Sustaining Robots".

Miniature Ambient Light Photo Sensor with Digital (SMBus) Output, Avago Technologies, Dec. 29, 2009.
Loss Power, Low LUX Digital Ambient Light Sensors, Avago Technologies, 2005.
Intelligent Sensing With Ambient Light and Optical Proximity Sensors, Avago Technologies, Oct. 22, 2008.
Transfer Molding Compound Sample-Black, Nitto Denko Corp., 2008.
Clear Transfer Molding Compound NT-8506, Nitto Denko Corp., 2001.

* cited by examiner

*Primary Examiner* — Joseph Haley
*Assistant Examiner* — Ifedayo Iluyomade

(57) ABSTRACT

Various embodiments of an ambient light sensor configured to determine the direction of a beam of light incident thereon are disclosed. In one embodiment, an ambient light sensor is provided that comprises a plurality of light detectors arranged in a spatial array upon a light sensing surface. Each of the light detectors in the array is configured to generate an analog output voltage in response to the beam of ambient light falling thereon. The amount of light incident on the individual light detectors in the spatial array varies according to the position of each such sensor with respect to direction of the beam of ambient light. An analog-to-digital converter (ADC) is operably coupled to the plurality of light detectors and is configured to receive the analog output signals generated thereby as inputs thereto, and to provide digital output values representative of the analog signals. Control logic circuitry is operably coupled to the ADC and configured to receive the digital output values therefrom, and is further configured to process such digital output values to determine the direction of the beam of light incident upon the spatial array.

35 Claims, 10 Drawing Sheets

AMBIENT LIGHT SENSOR CONFIGURED TO DETERMINE THE DIRECTION OF A BEAM OF AMBIENT LIGHT INCIDENT THEREON

FIELD OF THE INVENTION

Various embodiments of the inventions described herein relate to the field of ambient light sensors, and components, devices, systems and methods associated therewith.

BACKGROUND

Ambient light sensors are employed in a variety of different applications, some of which are described in "Intelligent Sensing with Ambient Light and Optical Proximity Sensors—Application Reference Guide," published by Avago Technologies™ in 2008, and hereby incorporated by reference herein in its entirety. Ambient light sensors find widespread use in mobile and computing devices such as mobile handsets, smart phones, PDA, notebooks, and desktop PCs.

Known ambient light sensors are generally incapable, however, of determining the direction of light falling thereon. What is needed is an ambient light sensor capable of determining the direction of ambient light falling thereon, as well as an ambient light sensor that features improved performance, lower cost, increased manufacturability and improved reliability.

SUMMARY

In some embodiments, there is provided an ambient light sensor comprising a substantially optically opaque light sensor cover having at an aperture disposed therethrough, the aperture being configured to permit a portion of an ambient light beam incident on an external surface thereof to pass therethrough as a transmitted light beam, a plurality of light detectors arranged in a spatial array upon a light sensing surface, each of the light detectors having a position in the array and being configured to generate analog output signals when at least a portion of the transmitted light beam falls thereon, at least one analog-to-digital converter (ADC) operably coupled to the plurality of light detectors and configured to receive as inputs thereto the analog output signals, the ADC further being configured to provide as outputs therefrom digital values representative of the analog output signals, and control logic circuitry operably coupled to the ADC and configured to receive the digital values as inputs thereto, wherein the transmitted light beam has a direction with respect to the plurality of light detectors and the light sensing surface, the amount of light incident on each light detector varies according to the position of each such light detector with respect to the transmitted light beam, and the control logic circuitry or a host processor is configured to process the digital values to determine the direction.

In other embodiments, there is provided an ambient light sensor comprising a substantially optically transmissive light sensor cover comprising an external surface and a substantially optically opaque light blocking element disposed at least one of near, in and on the external surface, the cover being configured to permit portions of an ambient light beam incident thereon to pass therethrough, the light blocking element being configured to cast a corresponding shadow hereebeneath when the ambient light beam is incident thereon, a plurality of light detectors arranged in a spatial array upon a light sensing surface, each of the light detectors having a position in the array and being configured to generate analog output signals when at least a portion of the ambient light beam falls thereon, at least one analog-to-digital converter (ADC) operably coupled to the plurality of light detectors and configured to receive as inputs thereto the analog output signals, the ADC further being configured to provide as outputs therefrom digital values representative of the analog output signals, and control logic circuitry operably coupled to the ADC and configured to receive the digital values as inputs thereto, wherein the ambient light beam and the shadow substantially share a direction with respect to the plurality of light detectors and the light sensing surface, the amount of light incident on each light detector varies according to the position of the light detector with respect to the shadow, and the control logic circuitry or a host processor is configured to process the digital values to determine the direction.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME PREFERRED EMBODIMENTS

In the following Detailed Description, reference is made to the accompanying drawings, which form a part hereof, and in which are illustrated specific embodiments according to which the invention may be practiced. In this regard, directional terminology, such as "top," "bottom," "upper," "lower," "atop," "beneath," "forward," "backward," "side," "front," "back," etc., is used with reference to the orientation of the Figures being described. Because the components of various embodiments of the invention may be positioned in a number of different orientations, the directional terminology is used for purposes of illustration and is in no way limiting. It is to be understood that other embodiments may be utilized, and that structural or logical changes may be made without departing from the scope of the present invention. The following Detailed Description, therefore, is not to be taken in a limiting sense, and the scope of the present invention is defined by the appended claims.

Figure 1:
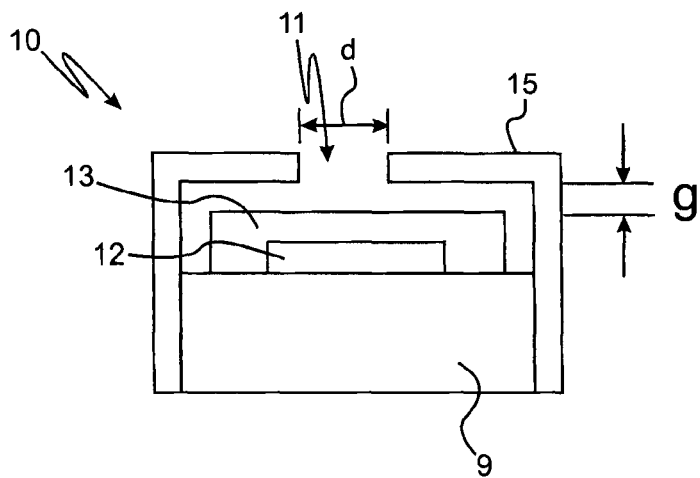
FIG. 1 shows a cross-sectional view of one embodiment of an ambient light sensor.

FIG. 1 shows a cross-sectional view of one embodiment of an ambient light sensor comprising substantially optically opaque cover 15, aperture 11 disposed through cover 15 and having diameter or width d, substrate 9, a light sensing surface or chip having an array of light detectors 12 disposed atop substrate 9, and substantially optically transmissive overmolding 13 disposed over array of light detectors 12. Note that according to one embodiment Nitto Denko® Clear Transfer Molding Compound NT-8506 may be employed to form substantially optically transmissive overmolding 13.

Figure 2:
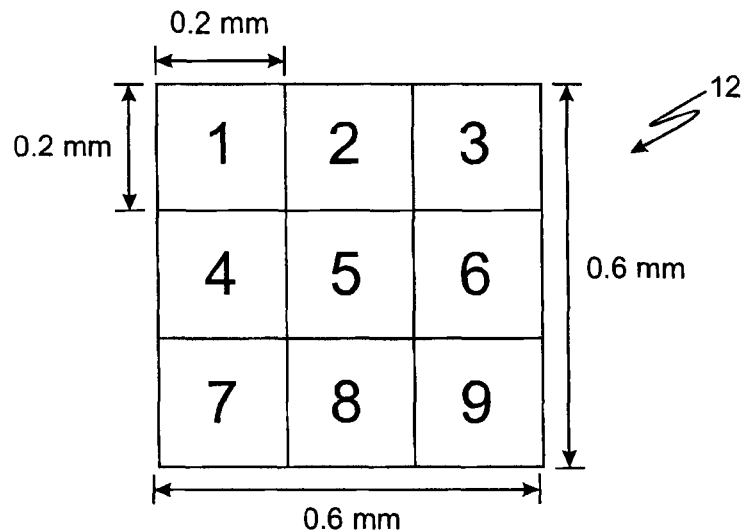
FIG. 2 shows a top plan view of one embodiment of a plurality of light detectors arranged in a spatial array.

FIG. 2 shows a top plan view of the positions of a plurality of light detectors arranged in a spatial array 12 upon a light sensing surface in ambient light detector 10 (see FIG. 1). Individual light detector positions are designated by numbers 1 through 9, and the nine light detectors corresponding thereto are arranged in spatial array 12. In the embodiment illustrated in FIG. 2, each light detector is about 0.2 mm×0.2 mm, and the overall light sensing chip or array of light detectors is 0.6 mm×0.6 mm.

Note that numbers 1 through 9 appearing in FIGS. 1, 2, 3, 4, 5, 6, 8, 9, 10 and 11 are for illustrative purposes only, and are essentially provided for ease and clarity of discussion and description; in an actual ambient light sensor such numbers would most likely not be included on the light sensing surface, and only the individual (unnumbered) light detectors would be provided.

As will be appreciated by those skilled in the art after having read and understood the specification and drawings hereof, a suitable or optimum number of light detectors in the ambient light sensor may vary according to the particular application at hand, such as, by way of example, determining motion near the ambient light sensor, determining whether or not an object is near the ambient light sensor, or determining the direction of light incident on the ambient light sensor. For example, the number of light detectors in spatial array 12 may equal or exceed two, three, four, five, six, seven, eight, nine, ten, eleven, twelve, thirteen, fourteen, fifteen, sixteen or more light detectors.

Light detectors 1 through 9 in array 12 may be, by way of example, photodiodes or photodetectors. The light detectors are arranged in a spatial array on a light sensing surface or substrate of the ambient light sensor, and according to one embodiment are sufficient in number to ascertain the direction of light incident thereon, more about which is said below. The light detectors are configured to generate individual voltage or current output signals corresponding to each light detector, where the individual signals are proportional to the amount of light incident on each light detector. In one embodiment, the light detectors are photodiodes implemented using an to in a CMOS process.

Figure 3:
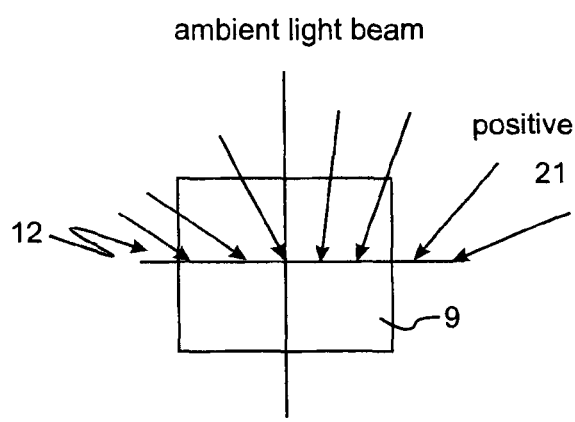
FIG. 3 shows one embodiment of variations in the directions or azimuths of ambient light beams incident upon a spatial array of light detectors.

FIG. 3 shows variations in the directions or azimuths of ambient light beams 21 incident upon spatial array 12 of light detectors or photodiode cells in ambient light sensor 10, where the directions or azimuths of ambient light beams 21 incident upon spatial array 12 vary between −40 degrees and +40 degrees. In FIG. 3, ambient light beam 21 is rotated from negative to positive angles of incidence along a center horizontal axis with respect to the center of spatial array 12 and aperture 11.

Figure 4:
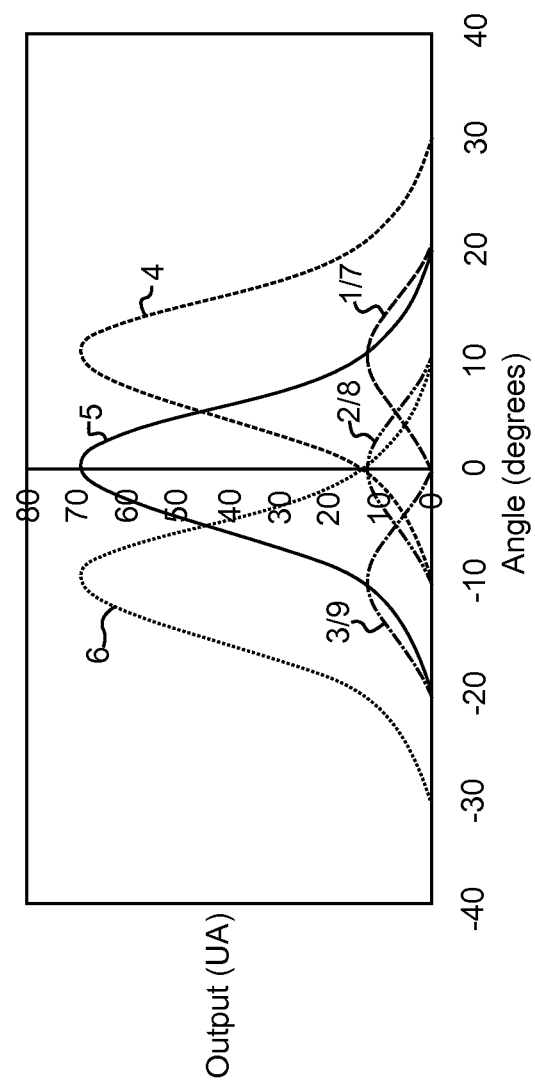
FIG. 4 shows simulated results obtained using an ambient light sensor designed in accordance with the ambient light sensors shown in FIGS. 1 and 2.

Such variations in the direction of ambient light beam 21 were employed to generate the simulated results shown in FIG. 4, where ambient light sensor 10 was designed in accordance with the embodiments shown in FIGS. 1 and 2, and where aperture diameter or width d was set at 0.3 mm, and gap g was set at 1 mm. In FIG. 4, light response curves corresponding to individual photodiodes or light detectors 1 through 9 are labelled with their corresponding numbers in accordance with the layout of the light detectors shown in FIG. 2. FIG. 4 shows that as ambient light beam 21 is rotated between −40 degrees and +40 degrees the center row of light detectors (i.e., light detectors 4, 5 and 6 in FIG. 2) detect higher amounts of light than do light detectors 1, 2, 3, 7, 8 and 9 located along the edges of spatial array 12. FIG. 4 further shows that as ambient light beam 21 is rotated between −40 degrees and +40 degrees one photodiode cell (corresponding to light detector 5 in array 12) receives the greatest amount of light. Exceptions occur where photodiode cells or light detectors 4 and 5 adjoin, and where photodiode cells or light detectors 5 and 6 adjoin, at −15 degrees and +15 degrees, respectively, and where high amounts of light are also received.

Figure 5:
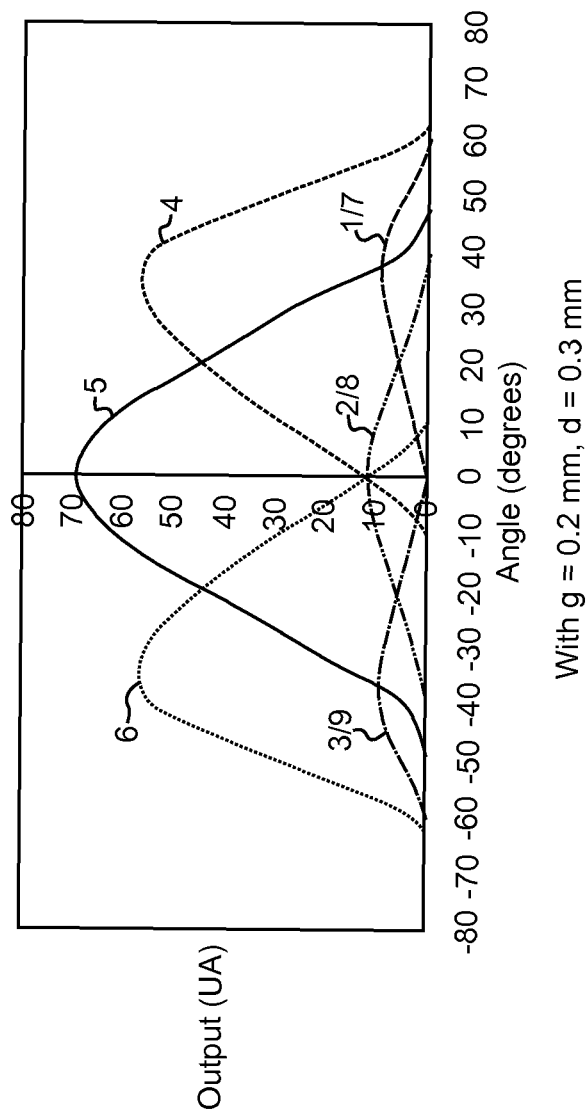
FIG. 5 shows simulated results obtained using an ambient light sensor designed in accordance with the ambient light sensors shown in FIGS. 1 and 2.

FIG. 5 shows simulated results obtained using ambient light sensor 12 designed in accordance with the embodiments shown in FIGS. 1 and 2, where gap g equalled 0.2 mm and the width d of the aperture had a diameter of 0.3 mm. FIGS. 3, 4, 5 and 6 show that when spatial array 12 has dimensions of 0.6 mm×0.6 mm, the diameter or width of aperture 11 optimally ranges between about 0.15 mm and about 0.3 mm. Such widths or diameters allow a reasonable amount of light to fall on light detectors 1 through 9, and permit reasonable differentiation to be effected between the amounts of light falling on the different light detectors. FIGS. 3, 4, 5 and 6 also show that as aperture 11 becomes smaller, the angular range of ambient light beams permitted to pass therethrough becomes ever more narrow. FIGS. 3, 4, 5 and 6 also show that gap g optimally ranges between about 0.2 mm and about 1 mm, which permits the angular range of detected directions not to be too narrow. Such a range of gaps g also yields a detectable range of between about + and −30 degrees, and about + and −60 degrees for directions of ambient light beam 21, and also minimizes the overall height of ambient light sensor 10.

Figure 6:
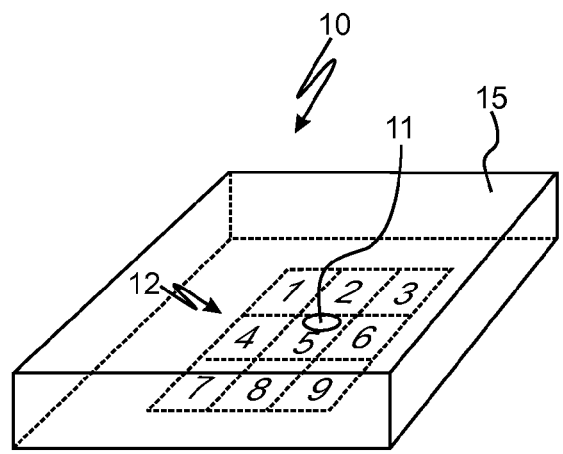
FIG. 6 shows a top right perspective view of one embodiment of an ambient light sensor comprising a substantially optically opaque cover with an aperture disposed therethrough.

Referring now to FIG. 6, there is shown a top right perspective view of one embodiment of ambient light sensor 10 comprising substantially optically opaque cover 15 with aperture 11 disposed therethrough, and an underlying light sensing surface comprising spatial array 12 of nine light detectors numbered 1 through 9 disposed thereon.

Figure 7:
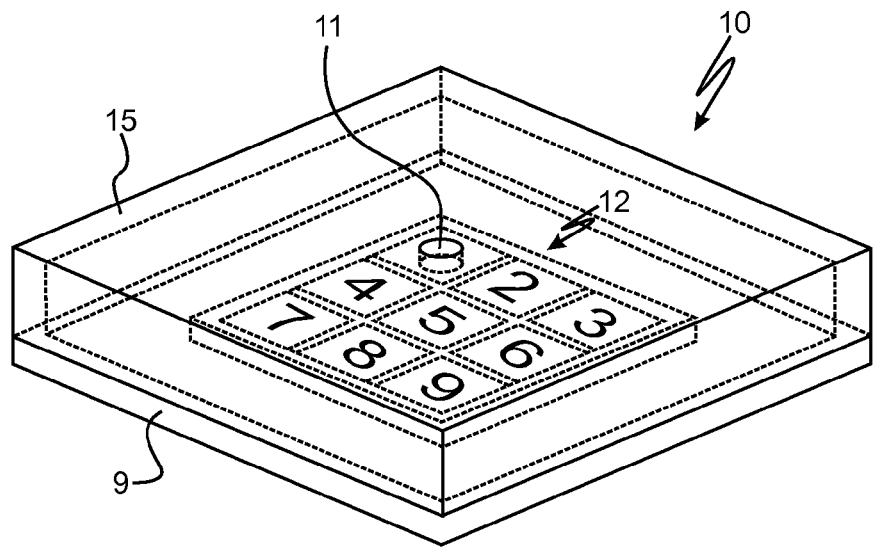
FIG. 7 shows a top right perspective view of another embodiment of an ambient light sensor.
Figure 8:
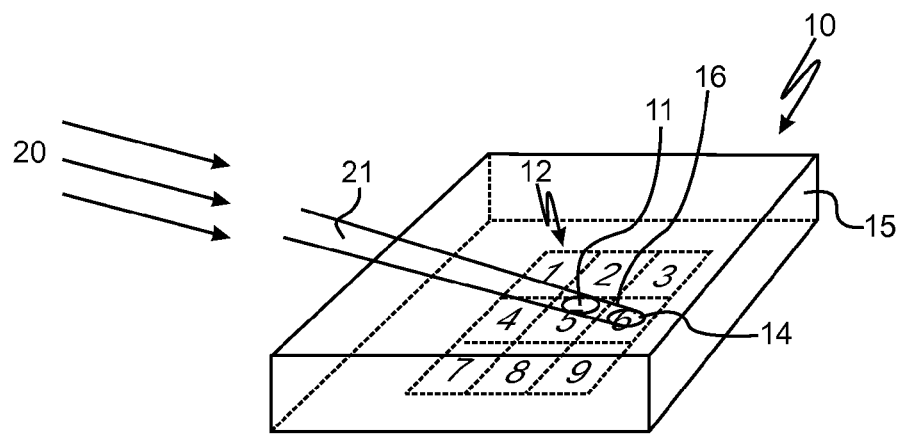
FIG. 8 shows a top right perspective view of the ambient light sensor of FIG. 6 with an ambient light beam having a first direction incident thereon.

FIG. 7 shows a top right perspective view of another embodiment of ambient light sensor 10 comprising substantially optically opaque cover 15 with aperture 11 disposed therethrough, and underlying light sensing surface 16 having spatial array 12 of nine light detectors numbered 1 through 9 disposed thereon. In one embodiment, and as shown in FIG. 8, ambient light sensor 10 includes spatial array 12, which is a semiconductor device having photodiodes 1 through 9 formed thereon, and cover 15 is formed or molded from a substantially optically non-transmissive material such an a suitable plastic or epoxy. According to one embodiment, Nitto Denko® Sample-Black Transfer Molding Compound is employed to form substantially optically opaque cover 15.

Referring now to FIG. 8, there is shown one embodiment of ambient light sensor 12 comprising light detectors 1 through 9 disposed upon a light sensing surface and arranged in spatial array 12, where substantially optically opaque light sensor cover 15 has aperture 11 disposed therethrough. Aperture 11 is configured to permit a portion of ambient light beam 21 formed by light rays 20 incident on an external surface of cover 15 thereof to pass through aperture 11 as transmitted light beam 16. Each of light detectors 1 through 9 is configured to generate an analog output signal when at least a portion of transmitted light beam 16 falls thereon. At least one analog-to-digital converter (ADC) 50 is operably coupled to the plurality of light detectors 1 through 9 and is configured to receive as inputs thereto such analog output signals (see FIG. 11). ADC 50 is further configured to provide as outputs therefrom digital values representative of the analog output signals. Control logic circuitry 60 is operably coupled to ADC 50 and is configured to receive the digital values as inputs thereto (see FIG. 11).

Continuing to refer to FIG. 8, light rays 20 and ambient light beam 21 approach ambient light sensor 10 and cover 15 from the left side of ambient light sensor 10 at a medium angle, and transmitted light beam 16 has a first direction and/or azimuth with respect to the plurality of light detectors 1 through 9 and the light sensing surface. The amount of light incident on each of the plurality of light detectors 1 through 9 varies in accordance with the positions of such light detectors with respect to transmitted light beam 16, where light detector 6 generates a high output analog signal, and light detectors 4, 7 and 8 generate lower output analog signals. In FIG. 8, the direction of transmitted light beam 16 is such that light detector 6 receives the greatest amount of light (and therefore generates the highest output analog signal), while light detectors 4, 7 and 8 receive the smallest amounts of light (and therefore generate the lowest output analog signals). In FIG. 8, light detectors 1, 2, 3, 5 and 8 generate output analog signals of intermediate amplitude. Cover 15 of ambient light sensor 10 and aperture 11 disposed thereon are configured to generate differences in the amount of light incident on each of light detectors 1 through 9 in spatial array 12, and thus light detectors 1 through 9 generate output signals that differ from one another in accordance with the direction, azimuth and/or angle of transmitted light beam 16 incident on array 12.

Control logic circuitry 60 or a host processor (see FIG. 11) processes the digital signals representative of the analog output signals provided by light detectors 1 through 9 and determines that light detector 6 has highest value associated therewith, and that other light detectors have correspondingly lower values associated therewith that taper off in accordance with the direction and geometry of transmitted light beam 16 as it is projected upon array 12 in FIG. 8, and on that basis the first direction is calculated by control logic circuitry 60. That is, the various digital values received by control logic circuitry 60 are employed to calculate the first direction of transmitted light beam 16. Such calculations may be carried out according to any of a number of two-dimensional computational techniques, such as simple matrix analyses, contour mapping analyses, array mapping techniques, least-square fitting techniques, Toeplitz matrices, invariance techniques, digital filtering techniques, and other computational techniques known to those skilled in the art, and may further include the determination not only of the direction or azimuth of the ambient light upon ambient light sensor 12, but also the angle of such light with respect to ambient light sensor 12 and the amplitude or strength of such light.

The size, shape and/or diameter of aperture 11 is preferably configured to provide a transmitted light beam 16 that is reasonably well defined and collimated, and that does not result in very much scattered or diffracted light beneath cover 15. Note further that one or more lenses may be fitted atop, in or beneath aperture 11 and/or cover 15 to collimate transmitted light beam, or to filter the wavelengths or other properties of same.

Figure 9:
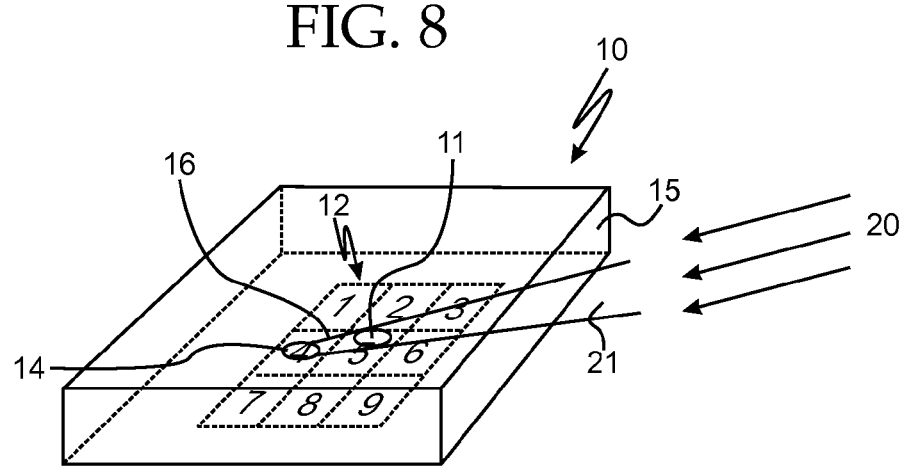
FIG. 9 shows a top right perspective view of the ambient light sensor of FIG. 6 with an ambient light beam having a second direction incident thereon.
Figure 10:
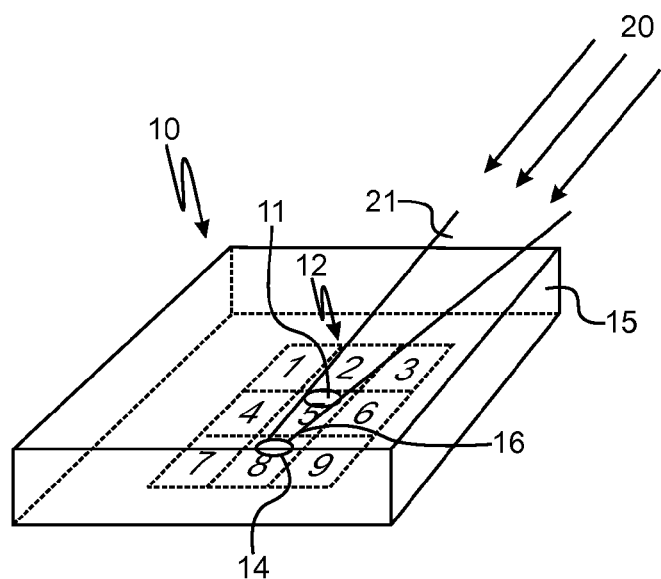
FIG. 10 shows a top right perspective view of the ambient light sensor of FIG. 6 with an ambient light beam having a third direction incident thereon.

FIGS. 9 and 10 further illustrate the operational principles described above, where ambient light beam 21 assumes different directions and angles with respect to ambient light sensor 10.

In FIG. 9, light rays 20 and ambient light beam 21 approach ambient light sensor 10 and cover 15 from the right side of ambient light sensor 10 at a relatively low angle. In FIG. 9, transmitted light beam 16 has a second direction with respect to the plurality of light detectors 1 through 9 and the light sensing surface, where the second direction is different from the first direction of FIG. 8. In FIG. 9, the amount of light incident on each of the plurality of light detectors 1 through 9 varies in accordance with the positions of such light detectors with respect to transmitted light beam 16, where light detector 4 generates a high output analog signal, and light detectors 3, 6 and 9 generate lower output analog signals. In FIG. 9, light detectors 1, 2, 5, 7 and 8 generate output analog signals of intermediate amplitude. Control logic circuitry 60 or a host processor (see FIG. 11) processes the digital signals representative of the analog output signals provided by light detectors 1 through 9 and determines that light detector 4 has highest value associated therewith, that other light detectors have correspondingly lower values associated therewith that taper off in accordance with the direction and geometry of transmitted light beam 16 as it is projected upon array 12 in FIG. 9, and on that basis the second direction is calculated by control logic circuitry 60.

In FIG. 10, light rays 20 and ambient light beam 21 approach ambient light sensor 10 and cover 15 from the top right corner of ambient light sensor 10 at a relatively high angle. In FIG. 10, transmitted light beam 16 has a third direction with respect to the plurality of light detectors 1 through 9 and the light sensing surface, where the third direction is different from the first direction of FIG. 8. In FIG. 10, the amount of light incident on each of the plurality of light detectors 1 through 9 varies in accordance with the positions of such light detectors with respect to transmitted light beam 16, where light detector 8 generates a high output analog signal, and light detectors 1, 2 and 3 generate lower output analog signals. In FIG. 10, light detectors 4, 5, 6, 7 and 9 generate output analog signals of intermediate amplitude. Control logic circuitry 60 or a host processor (see FIG. 7)

processes the digital signals representative of the analog output signals provided by light detectors 1 through 9 and determines that light detector 8 has highest value associated therewith, and that other light detectors have correspondingly lower values associated therewith that taper off in accordance with the direction and geometry of transmitted light beam 16 as it is projected upon array 12 in FIG. 10, and on that basis the third direction is calculated by control logic circuitry 60.

Figure 11:
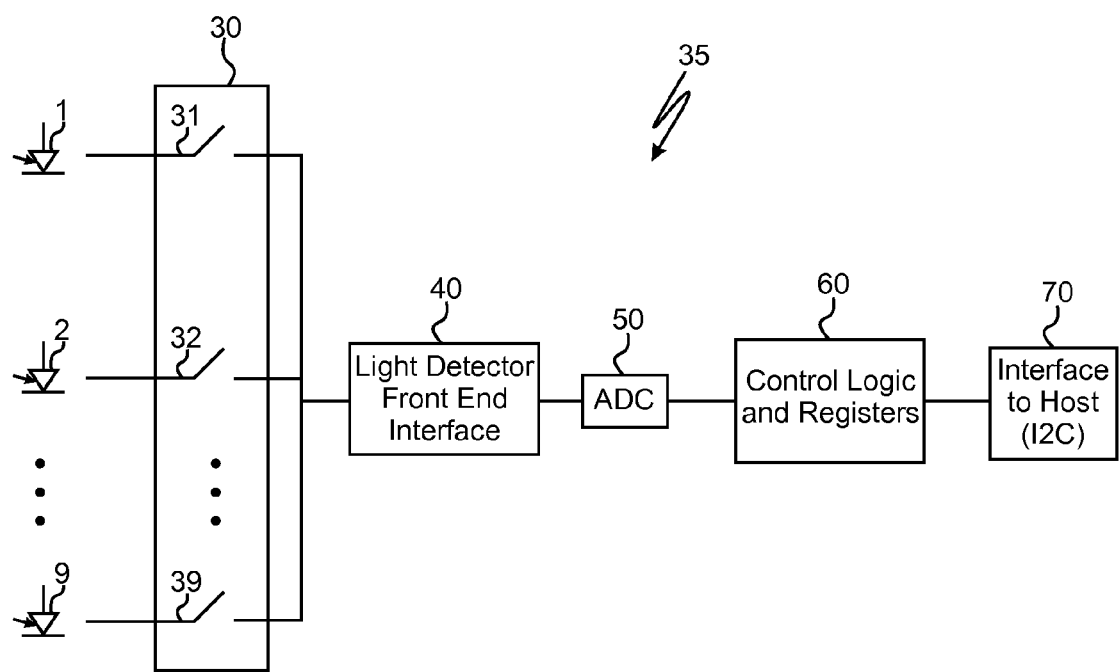
FIG. 11 shows one embodiment of ambient light sensor circuitry configured to process analog signals provided by the light detectors.
Figure 12:
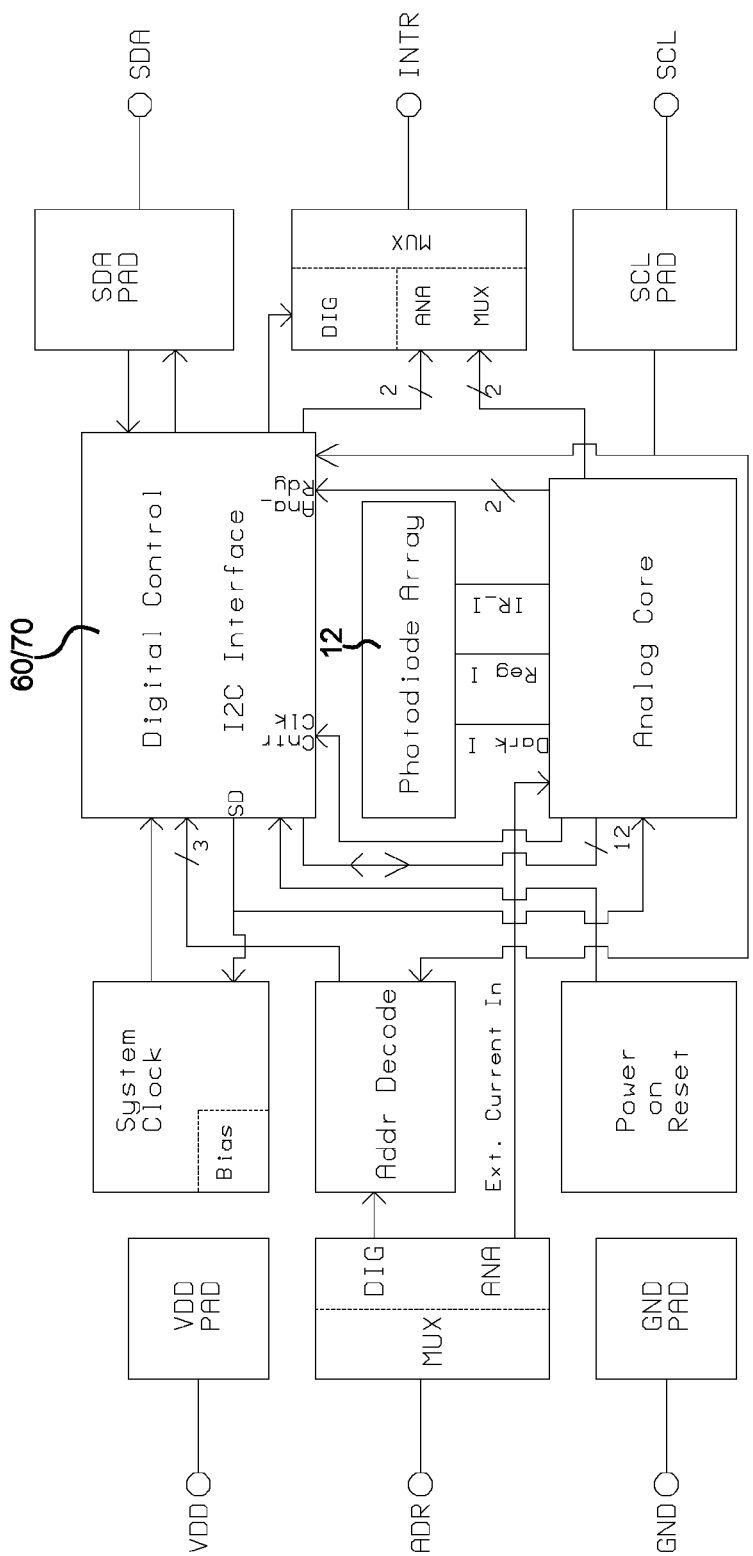
FIG. 12 shows one embodiment of a block diagram of further circuitry that may be associated with an ambient light sensor.
Figure 13:
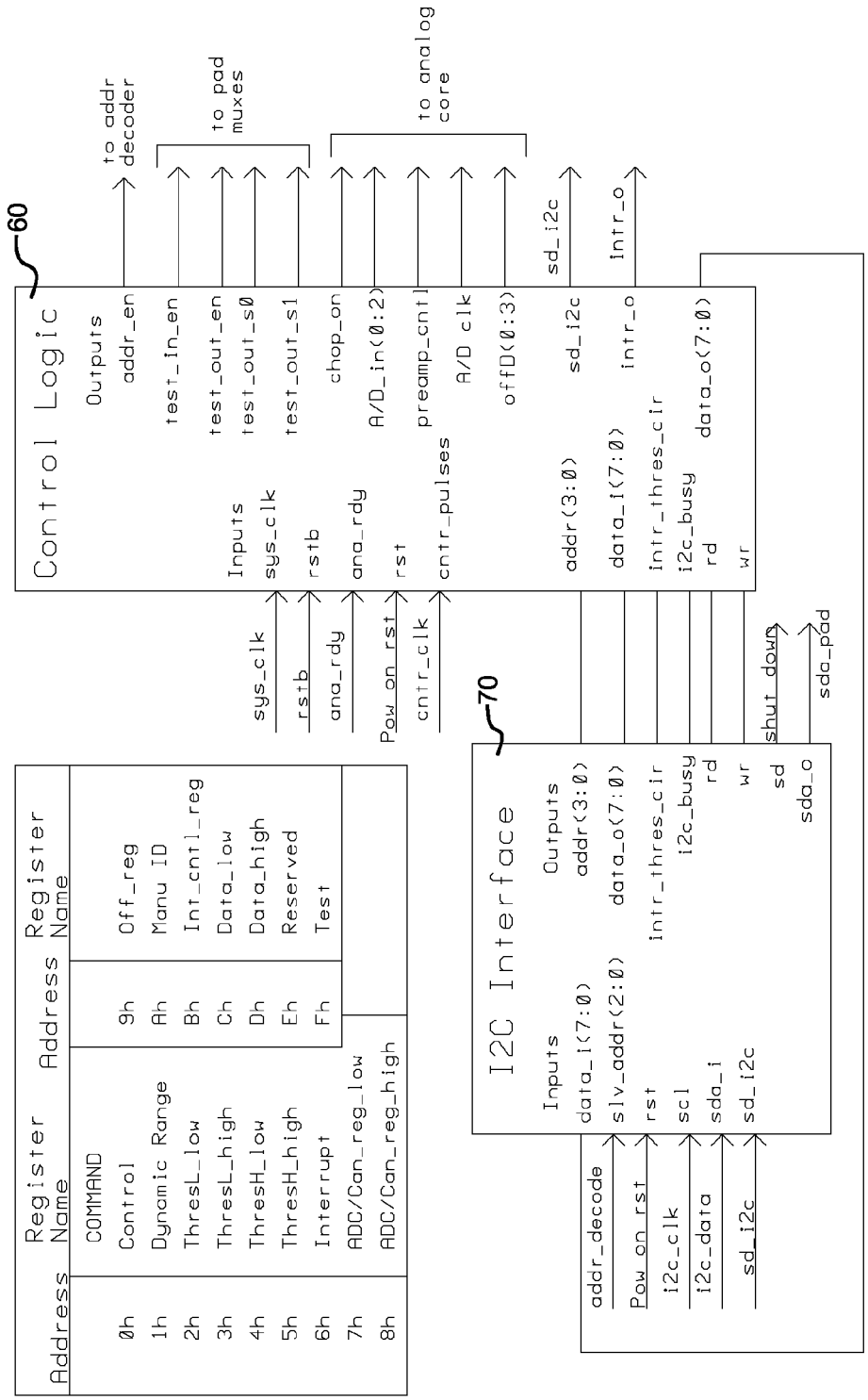
FIG. 13 shows one embodiment of control logic circuitry 60 and I2C interface 70 with corresponding addresses and register names.

FIG. 11 shows one embodiment of circuitry 35 configured to process the analog output signals generated by the light detectors and provide outputs representative of the direction of transmitted light beam 16. In the embodiment shown in FIG. 11, switch control 30 comprises switches 31 through 39, where switches 31 through 39 are configured to permit a single analog output signal provided by a single light detector (or single group of light detectors operably connected to one another) to be read one at a time. Thus, in the embodiment shown in FIG. 11, the output signals provided by light detectors 1 through 9 are multiplexed one at a time to light detector front end interface 40, ADC 50, control logic circuitry 60 and interface to host 70 for further processing. Light detector front end interface 40 may include analog filtering circuitry, such as high-, low- or bandpass-filtering circuitry. ADC 50 is configured to convert the analog signals presented thereto into digital values. Control logic circuitry 60 is configured to receive the digital output values signals provided by ADC 50, and in one embodiment comprises control logic for storing the 9 digital values corresponding to each of the light detectors, and for further processing same to determine the direction of transmitted light beam 16, or alternatively means for transferring such digital values to a host processor via interface to host 70, which according to one embodiment is an I2C interface. Those skilled in the art will now appreciate that numerous alternative embodiments of the circuitry shown in FIG. 11 may be employed to provide essentially the same result as that provided by the circuitry of FIG. 11. For example, the analog output signals provided by the light detectors may be read simultaneously and in parallel by suitable front end interface and ADC circuitry. FIG. 12 shows one embodiment of a block diagram of further circuitry that may be associated with ambient light sensor 10. FIG. 13 shows one embodiment of control logic circuitry 60 and I2C interface 70 with corresponding addresses and register names.

Note that control logic circuitry 60 or the host processor may be configured to generate signals representative of the direction, to generate feedback control signals representative of the direction, to detect, on the basis of the digital values, motion proximate the ambient light sensor, to detect, on the basis of the digital values, an object proximate the ambient light sensor. Outputs from the control logic circuit or the host processor may be employed to control operation of a device, such as the orientation of one or more solar panels with respect to the sun, to turn the device on or off, changing a power consumption level of the device, conserving battery power of the device, adjusting a backlight intensity of the device where the device is an LCD, adjusting the brightness of the device where the device is a display.

Figure 14:
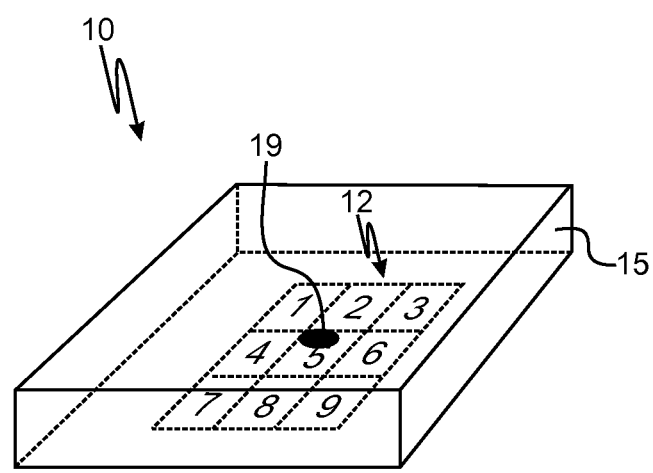
FIG. 14 shows a top plan view of another embodiment of an ambient light sensor comprising a substantially optically transmissive cover with a light blocking element disposed thereon or therein.

Referring now to FIG. 14, there is shown a top right perspective view of one embodiment of ambient light sensor 10 comprising substantially optically transmissive cover 15 with light blocking element 19 disposed thereon or formed therein, and an underlying light sensing surface comprising spatial array 12 of nine light detectors numbered 1 through 9 disposed thereon. Note that according to one embodiment Nitto Denko® Clear Transfer Molding Compound NT-8506 may be employed to form substantially optically transmissive cover 15.

Figure 15:
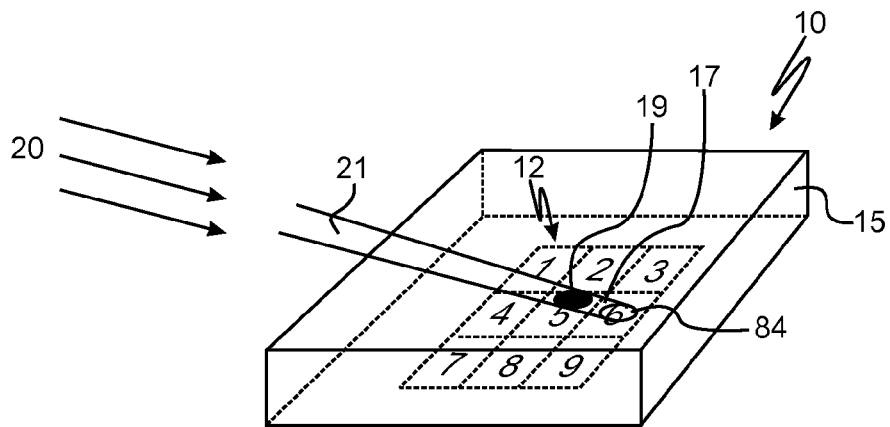
FIG. 15 shows a top right perspective view of the ambient light sensor of FIG. 14 with an ambient light beam having a first direction incident thereon.

Referring now to FIG. 15, there is shown one embodiment of ambient light sensor 10 comprising light detectors 1 through 9 disposed upon a light sensing surface and arranged in spatial array 12, where substantially optically transmissive cover 15 has an external surface and a substantially optically opaque light blocking element 19 disposed near, in or on the external surface. Cover 15 is configured to permit portions of ambient light beam 21 incident thereon to pass therethrough. Light blocking element 19 is configured to cast corresponding shadow 17 therebeneath when ambient light beam 21 is incident thereon. Each of light detectors 1 through 9 is configured to generate an analog output signal when at least a portion of ambient light beam 21 falls thereon, as ambient light beam 21 is modified by shadow 17. Light blocking element 19 may be a pattern or discrete element formed, included, painted, inked, sprayed, etched, engraved, printed, pressed, embossed or molded into cover 15, or any other suitable element or material.

Figure 16:
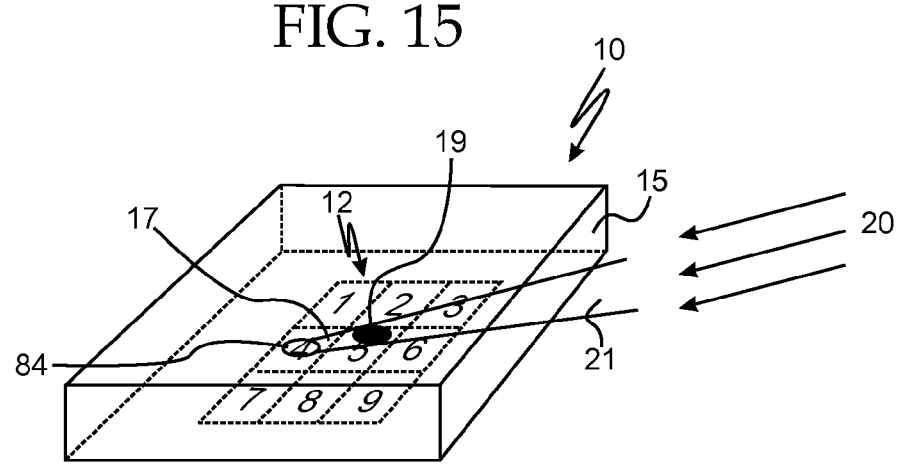
FIG. 16 shows a top right perspective view of the ambient light sensor of FIG. 14 with an ambient light beam having a second direction incident thereon.
Figure 17:
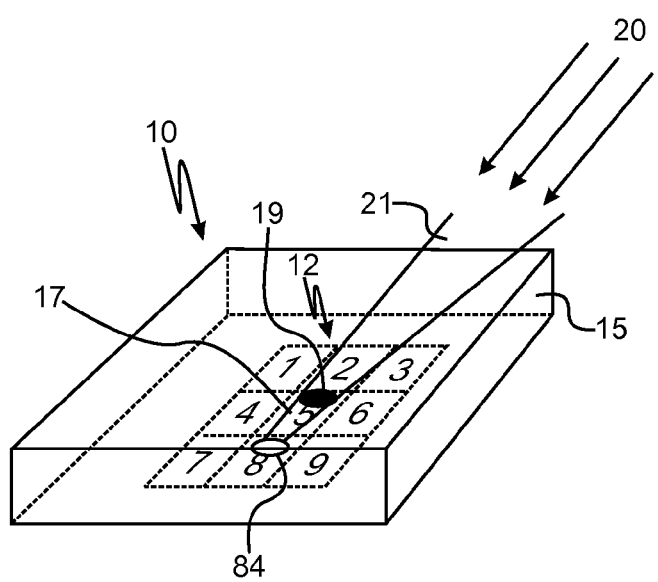
FIG. 17 shows a top right perspective view of the ambient light sensor of FIG. 14 with an ambient light beam having a third direction incident thereon.

As in FIGS. 8 through 10, in FIGS. 15 through 17 at least one analog-to-digital converter (ADC) 50 is operably coupled to the plurality of light detectors 1 through 9 and is configured to receive as inputs thereto such analog output signals (see FIG. 11). ADC 50 is further being configured to provide as outputs therefrom digital values representative of the analog output signals. Control logic circuitry 60 is operably coupled to ADC 50 and is configured to receive the digital values as inputs thereto (see FIG. 11). As seen by referring to FIGS. 15 through 17, ambient light beam 21 and shadow 17 substantially share a same direction with respect to the plurality of light detectors 1 through 9 and the corresponding light sensing surface, and the amount of light incident on each light detector varies according to the position of the light detector with respect to shadow 17.

Continuing to refer to FIG. 15, light rays 20 and ambient light beam 21 approach ambient light sensor 10 and cover 15 from the left side of ambient light sensor 10 at a medium angle, and shadow 17 has a first direction with respect to the plurality of light detectors 1 through 9 and the light sensing surface. The amount of light incident on each of the plurality of light detectors 1 through 9 varies in accordance with the positions of such light detectors with respect to shadow 17 and ambient light beam 21, where light detector 6 generates the lowest output analog signal, and light detectors 3, 5 and 9 generate the highest output analog signals. In FIG. 15, the direction of shadow 17 is such that light detector 6 receives the least amount of light (and therefore generates the lowest output analog signal), while light detectors 3, 5 and 9 receive the highest amounts of light (and therefore generate the highest output analog signals). In the example of FIG. 15, light detectors 1, 2, 4, 7 and 8 generate output analog signals of intermediate amplitude. Cover 15 of ambient light sensor 10 and light blocking 19 disposed thereon are configured to generate differences in the amount of light incident on each of light detectors 1 through 9 in spatial array 12, and thus light detectors 1 through 9 generate output signals that differ from one another in accordance with the direction or azimuth of shadow 17 and ambient light beam 21 as they are incident on array 12.

Control logic circuitry 60 or a host processor (see FIG. 11) processes the digital signals representative of the analog output signals provided by light detectors 1 through 9 and determines that light detector 6 has lowest value associated therewith, and that other light detectors have correspondingly higher values associated therewith that taper off in accordance with the direction and geometry of shadow 17 as it is projected upon array 12 in FIG. 9, and on that basis the first direction is calculated by control logic circuitry 60. That is, the various digital values received by control logic circuitry 60 are employed to calculate the first direction of shadow 17. Such calculations may be carried out according to any of a number of two-dimensional computational techniques, such as simple matrix analyses, contour mapping analyses, array mapping techniques, least-square fitting techniques, Toeplitz matrices, invariance techniques, digital filtering techniques, and other computational techniques known to those skilled in the art, and may further include the determination not only of the direction or azimuth of the ambient light upon ambient light sensor 12, but also the angle of such light with respect to ambient light sensor 12 and the amplitude or strength of such light.

Note that the size, shape and/or diameter of light blocking element 19 is preferably configured to provide a shadow 17 that is reasonably well defined and collimated, and that does not result in very much scattered or diffracted light impinging on array 12.

FIGS. 16 and 17 further illustrate the operational principles described above, where ambient light beam 21 assumes different directions.

In FIG. 16, light rays 20 and ambient light beam 21 approach ambient light sensor 10 and cover 15 from the right side of ambient light sensor 10 at a relatively low angle. In FIG. 16, ambient light beam 21 and shadow 17 share a second direction with respect to the plurality of light detectors 1 through 9 and the light sensing surface, where the second direction is different from the first direction of FIG. 15. In FIG. 16, the amount of light incident on each of the plurality of light detectors 1 through 9 varies in accordance with the positions of such light detectors with respect to ambient light beam 21 and shadow 17, where light detector 4 generates a low output analog signal, and light detectors 1, 5 and 7 generate higher output analog signals. In FIG. 16, light detectors 2, 3, 6, 8 and 9 generate output analog signals of intermediate amplitude. Control logic circuitry 60 or a host processor (see FIG. 11) processes the digital signals representative of the analog output signals provided by light detectors 1 through 9 and determines that light detector 4 has lowest value associated therewith, that other light detectors have correspondingly higher values associated therewith that taper off in accordance with the direction and geometry of shadow 17 and ambient light beam 21 as they are projected upon array 12 in FIG. 16, and on that basis the second direction is calculated by control logic circuitry 60.

In FIG. 17, light rays 20 and ambient light beam 21 approach ambient light sensor 10 and cover 15 from the top right corner of ambient light sensor 10 at a relatively high angle. In FIG. 17, shadow 17 and ambient light beam 21 share a third direction with respect to the plurality of light detectors 1 through 9 and the light sensing surface, where the third direction is different from the first direction of FIG. 15. In FIG. 17, the amount of light incident on each of the plurality of light detectors 1 through 9 varies in accordance with the positions of such light detectors with respect to shadow 17 and ambient light beam 21, where light detector 8 generates a low output analog signal, and light detectors 5, 6 and 9 generate higher output analog signals. In FIG. 11, light detectors 1, 2, 3, 4 and 7 generate output analog signals of intermediate amplitude. Control logic circuitry 60 or a host processor (see FIG. 11) processes the digital signals representative of the analog output signals provided by light detectors 1 through 9 and determines that light detector 8 has lowest value associated therewith, and that other light detectors have correspondingly higher values associated therewith that taper off in accordance with the direction and geometry of shadow 17 and ambient light beam 21 as they are projected upon array 12 in FIG. 17, and on that basis the third direction is calculated by control logic circuitry 60.

As with respect to the embodiments shown in FIGS. 8, 9 and 10, control logic circuitry 60 or the host processor operably connected to the light detectors of FIGS. 15 through 17 may be configured to generate signals representative of the direction, to generate feedback control signals representative of the direction, to detect, on the basis of the digital values, motion proximate the ambient light sensor, to detect, on the basis of the digital values, an object proximate the ambient light sensor. Outputs from the control logic circuit or the host processor may be employed to control operation of a device, such as the orientation of one or more solar panels with respect to the sun, to turn the device on or off, changing a power consumption level of the device, conserving battery power of the device, adjusting a backlight intensity of the device where the device is an LCD, adjusting the brightness of the device where the device is a display.

Note that overmolding 13 and cover 15 of ambient light sensor 10 may be formed by transfer molding processes, which may include the use of thermosetting materials softened by heat and pressure in a transfer chamber, and then forced at high pressure through suitable sprues, runners, and gates into a closed mold for final curing. Casting, injection molding and other suitable methods and processes may also be employed to form various molded components of ambient light sensor 10.

Various aspects of the embodiments disclosed herein are to be found in a Preliminary Data Sheet entitled "APDS-9311 Low Power, Low LUX Digital Ambient Light Sensors" published by Avago Technologies™, filed on even data herewith as part of an Information Disclosure Statement, the entirety of which is hereby incorporated by reference herein, and in a Data Sheet entitled "APDS-9303 Miniature Ambient Light Photo Sensor with Digital(SMBus) Output" published by Avago Technologies™ on Dec. 29, 2009, also filed on even data herewith as part of an Information Disclosure Statement, the entirety of which is also hereby incorporated by reference herein.

Included within the scope of the present invention are methods of making and having made the various components, devices and systems described herein.

Those skilled in the art will understand that the various embodiments of the proximity sensor disclosed herein may be incorporated into portable electronic devices such as mobile telephones, smart phones, personal data assistants (PDAs), laptop computers, notebook computer, computers and other devices.

Various embodiments of the invention are contemplated in addition to those disclosed hereinabove. The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

We claim:
1. An ambient light sensor, comprising:
a substantially optically opaque light sensor cover having an aperture, the aperture being configured to permit a portion of an ambient light beam to pass therethrough as a transmitted light beam;

a plurality of light detectors arranged in a array adjacent to the aperture, each of the light detectors having a position in the array and being configured to generate analog output signals when at least a portion of the transmitted light beam falls thereon;

at least one analog-to-digital converter (ADC) operably coupled to the plurality of light detectors and configured to receive as inputs thereto the analog output signals, the ADC further being configured to provide as outputs therefrom digital values representative of the analog output signals, and a control logic circuitry operably coupled to the ADC and configured to receive the digital values as inputs thereto;

wherein the transmitted light beam transmitted through the aperture has a direction with respect to the plurality of light detectors, each of the plurality of light detectors is configured to receive a varying amount of light according to the position of each of the plurality of light detectors with respect to the transmitted light beam transmitted through the aperture; and wherein the control logic circuitry is configured to process the digital values to determine the direction of the transmitted light beam.

2. The ambient light sensor of claim 1, wherein at least some of the light detectors are photodiodes.

3. The ambient light sensor of claim 1, wherein the plurality of light detectors in the array comprises at least three light detectors.

4. The ambient light sensor of claim 1, wherein the plurality of light detectors in the array comprises at least seven light detectors.

5. The ambient light sensor of claim 1, wherein the plurality of light detectors in the array comprises at least nine light detectors.

6. The ambient light sensor of claim 1, wherein the control logic circuitry or a host processor operably coupled thereto is configured to provide an output representative of the direction to a host processor.

7. The ambient light sensor of claim 1, wherein the control logic circuitry or a host processor operably coupled thereto is configured to generate a feedback control signal representative of the direction.

8. The ambient light sensor of claim 7, wherein the control logic circuitry or a host processor operably coupled thereto is operably coupled to a device to which the feedback control signal is provided.

9. The ambient light sensor of claim 1, wherein the control logic circuitry or a host processor operably coupled thereto is further configured to detect, on the basis of the digital values, motion proximate the ambient light sensor.

10. The ambient light sensor of claim 1, wherein the control logic circuitry or a host processor operably coupled thereto is further configured to detect, on the basis of the digital values, an object proximate the ambient light sensor.

11. The ambient light sensor of claim 1, further comprising switch control circuitry disposed between the plurality of light detectors and the ADC, the switch control circuitry being configured to read one analog output signal at a time.

12. The ambient light sensor of claim 1, further comprising a front end interface circuit disposed between the plurality of light detectors and the ADC.

13. The ambient light sensor of claim 1, wherein outputs from the control logic circuit or a host processor operably coupled thereto are employed to control operation of a device.

14. The ambient light sensor of claim 13, wherein the operation controlled in accordance with the outputs is turning the device on or off.

15. The ambient light sensor of claim 13, wherein the operation controlled in accordance with the outputs is changing a power consumption level of the device.

16. The ambient light sensor of claim 13, wherein the operation controlled in accordance with the outputs is conserving battery power of the device.

17. The ambient light sensor of claim 13, wherein the device is an LCD and the operation controlled in accordance with the outputs is adjusting a backlight intensity of the LCD.

18. The ambient light sensor of claim 13, wherein the device is a display and the operation controlled in accordance with the outputs is adjusting the brightness of the display.

19. An ambient light sensor, comprising:
a substantially optically transmissive light sensor cover comprising an external surface and a substantially optically opaque light blocking element disposed at least one of near, in and on the external surface, the cover being configured to permit portions of an ambient light beam incident thereon to pass therethrough, the light blocking element being configured to cast a corresponding shadow therebeneath when the ambient light beam is incident thereon;

a plurality of light detectors arranged in a spatial array adjacent to the light blocking element, each of the light detectors having a position in the array and being configured to generate analog output signals when at least a portion of the ambient light beam falls thereon;

at least one analog-to-digital converter (ADC) operably coupled to the plurality of light detectors and configured to receive as inputs thereto the analog output signals, the ADC further being configured to provide as outputs therefrom digital values representative of the analog output signals, and a control logic circuitry operably coupled to the ADC and configured to receive the digital values as inputs thereto;

wherein the ambient light beam and the corresponding cast by the light blocking element substantially share a direction with respect to the plurality of light detectors and the light sensing surface, each of the plurality of light detectors is configured to receive a varying amount of light according to the position of the light detector with respect to the shadow cast by the light blocking element, and the control logic circuitry or a host processor is configured to process the digital values to determine the direction.

20. The ambient light sensor of claim 19, wherein at least some of the light detectors are photodiodes.

21. The ambient light sensor of claim 19, further comprising a front end interface circuit disposed between the plurality of light detectors and the ADC.

22. The ambient light sensor of claim 19, wherein outputs from the control logic circuit or a host processor operably coupled thereto are employed to control operation of a device.

23. The ambient light sensor of claim 22, wherein the operation controlled in accordance with the outputs is turning the device on or off.

24. The ambient light sensor of claim 22, wherein the operation controlled in accordance with the outputs is changing a power consumption level of the device.

25. The ambient light sensor of claim 22, wherein the operation controlled in accordance with the outputs is conserving battery power of the device.

26. The ambient light sensor of claim 22, wherein the device is an LCD and the operation controlled in accordance with the outputs is adjusting a backlight intensity of the LCD.

27. The ambient light sensor of claim 22, wherein the device is a display and the operation controlled in accordance with the outputs is adjusting the brightness of the display.

28. The ambient light sensor of claim 21, wherein the front end interface circuit comprises an analog filtering circuitry.

29. The ambient light sensor of claim 1, wherein the control logic circuitry is configured to determine the direction of the transmitted light beam with a computational technique, the computational technique comprises Toeplitz matrices, invariance techniques and digital filtering techniques.

30. The ambient light sensor of claim 1, wherein the control logic circuitry is configured to determine the direction of the transmitted light beam with a computational technique, the computational technique comprises matrix analyses, contour mapping analyses, least-square fitting techniques and array mapping techniques.

31. The ambient light sensor of claim 1, further comprising an interface to host.

32. An ambient light sensor, comprising:
an opaque cover;
a plurality of light detectors in a two dimensional array; and
an aperture of the opaque cover, the aperture is configured to permit a portion of an ambient light to pass therethrough as a transmitted light beam that falls on a portion of the plurality of light detectors in the two dimensional array;
wherein the cover and the aperture disposed thereon are configured to generate differences in an amount of light incident on each of the plurality of light detectors, and each of the plurality of light detectors is configured to generate analog output signals that differ from one another in accordance with a direction of the transmitted light beam transmitted through the aperture.

33. The ambient light sensor of claim 32, further comprising a substantially optically transmissive overmolding disposed over the plurality of light detectors.

34. The ambient light sensor of claim 32, wherein the cover is made from a thermosetting material.

35. The ambient light sensor of claim 32, wherein at least one of the plurality of light detectors is a photodiode with N-well/P-sub structure.

* * * * *